United States Patent
Anand et al.

(10) Patent No.: US 10,042,844 B2
(45) Date of Patent: Aug. 7, 2018

(54) EXPERT CONVERSATION BUILDER

(71) Applicant: International Business Machines Corporation, Armonk, NY (US)

(72) Inventors: Rangachari Anand, Teaneck, NJ (US); Juhnyoung Lee, Yorktown Heights, NY (US); Erik Thomas Mueller, Chevy Chase, MD (US); Melvin Perez-Cedano, Bellevue, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 494 days.

(21) Appl. No.: 14/075,796

(22) Filed: Nov. 8, 2013

(65) Prior Publication Data
US 2014/0067378 A1    Mar. 6, 2014

Related U.S. Application Data

(63) Continuation of application No. 12/985,050, filed on Jan. 5, 2011, now Pat. No. 8,612,233.

(51) Int. Cl.
G06F 17/28 (2006.01)
H04M 3/493 (2006.01)

(52) U.S. Cl.
CPC .......... *G06F 17/28* (2013.01); *H04M 3/4936* (2013.01); *H04M 2203/301* (2013.01); *H04M 2203/306* (2013.01)

(58) Field of Classification Search
CPC ................................................... H04M 3/4936
USPC ............................................. 704/270.1, 275
See application file for complete search history.

(56) References Cited

U.S. PATENT DOCUMENTS

| | | | |
|---|---|---|---|
| 5,243,689 | A | 9/1993 | Yoshiura et al. |
| 5,333,237 | A | 7/1994 | Stefanopoulos et al. |
| 5,632,007 | A | 5/1997 | Freeman |
| 5,694,558 | A | 12/1997 | Sparks et al. |
| 5,915,240 | A | 6/1999 | Karpf |
| 6,041,331 | A | 3/2000 | Weiner et al. |
| 6,044,347 | A | 3/2000 | Abella et al. |
| 6,236,989 | B1 | 5/2001 | Mandyam et al. |
| 6,246,981 | B1 | 6/2001 | Papineri et al. |
| 6,510,411 | B1 | 1/2003 | Norton et al. |
| 6,604,141 | B1 | 8/2003 | Ventura |
| 6,647,363 | B2 | 11/2003 | Claassen |
| 6,711,585 | B1 | 3/2004 | Copperman et al. |

(Continued)

FOREIGN PATENT DOCUMENTS

EP    1843564 A1    10/2007

OTHER PUBLICATIONS

Dietmer Jannach et al., Developing a Conversational Travel Advisor with Advisor Suite, Information and Coomunication Technologies in Tourism 2007, Proceedings of the International Conference in Ljubljana, Slovenia, 2007.

(Continued)

*Primary Examiner* — Susan McFadden
(74) *Attorney, Agent, or Firm* — Patent Portfolio Builders PLLC

(57) ABSTRACT

An expert conversation builder contains a knowledge database that includes a plurality of dialogues having nodes and edges arranged as directed acyclic graphs. Users and authors of the system interface with the knowledge database through a graphical interface to author dialogues and to create expert conversations as threads traversing the node in the dialogues.

17 Claims, 7 Drawing Sheets

(56) References Cited

U.S. PATENT DOCUMENTS

| | | | |
|---|---|---|---|
| 6,829,603 B1 | 12/2004 | Chai et al. | |
| 7,529,675 B2 | 5/2009 | Maes | |
| 7,640,164 B2 | 12/2009 | Sasaki et al. | |
| 8,285,652 B2 | 10/2012 | Biggs et al. | |
| 8,301,482 B2 | 10/2012 | Reynolds et al. | |
| 8,352,908 B2* | 1/2013 | Jhoney | G06F 8/38 717/106 |
| 8,374,859 B2 | 2/2013 | Huang et al. | |
| 8,452,772 B1* | 5/2013 | Carpio | G06F 17/30864 707/737 |
| 8,612,233 B2* | 12/2013 | Anand | H04M 3/4936 704/275 |
| 8,972,406 B2* | 3/2015 | Friedlander | G06F 19/18 707/719 |
| 9,471,872 B2* | 10/2016 | Anand | G06N 5/02 |
| 2007/0150299 A1 | 6/2007 | Flory | |
| 2011/0321008 A1* | 12/2011 | Jhoney | G06F 8/38 717/114 |
| 2012/0016661 A1* | 1/2012 | Pinkas | G06F 17/2785 704/9 |

OTHER PUBLICATIONS

Dragon-et al.; "Recognizing Dialogue Content in Student Collaborative Conversation"; International Confereence onIntelligent Tutoring Systems, Pittsbrugh, 2010.

Esther Levin et al., "A Stochastic Model of Computer-Human Interaction for Learning Dialogue Strategies", Eurospeech '97, 5th European conference on Speech Communication and Technology, Rhodes, Greece, Sep. 22-25, 1997.

Ian O'Neill et al., "Implementing Advanced Spoken Dialogue Management in Java", Science of Computer Programming 54 (2005), pp. 99-124.

Roberta Catizone et al., "Multimodal Dialogue Management in the COMIC Project", Proceedings of the ACL Interactive Poster and Demonstration Series, pp. 45-48, Ann Arbor, Jun. 2005.

W.A. Woods, "Transition Network Grammars for Natural Language Analysis", Communications of the ACM, vol. 13, No. 10, pp. 591-606, Oct. 1970.

Yacci-et al.; "Conversational Diagnostic Agent"; Google; 2002-2003.

* cited by examiner

EXPERT CONVERSATION BUILDER

CROSS-REFERENCE TO RELATED APPLICATIONS

The present application is a continuation of co-pending U.S. patent application Ser. No. 12/985,050 filed Jan. 5, 2011. The entire disclosure of that application is incorporated herein by reference.

FIELD OF THE INVENTION

The present invention relates to computer memory subsystems.

BACKGROUND OF THE INVENTION

Customer and technical support has long been provided by customer service or technical support personnel that interface with the customers over the telephone. More recently, a similar level of support is provided across the internet using E-mail or live chat windows. In general, these types of support address a particular issue by asking a series of questions in order to determine the nature of the issue and to identify an appropriate resolution. The support personnel ask the questions and process the answers. Therefore, the accuracy and efficiency is constrained by the skill and knowledge of a given support provider. That person may have other resources, such as a computer available to log responses and to provide information. In addition, interactive voice response systems have been used to handle these types of inquiries automatically.

Computer aided support and instruction systems have also been developed for other types of applications. For example, the PLATO® instruction system, which is commercially available from PLATO Learning, Inc., provides computer aided academic instruction. Programs have been developed to provide for interactive creation of fiction stories where a reader can interact with characters and the environment rather than simply reading a story linearly. An early example of such a text adventure is Adventure, which was written by Will Crowther, around 1975. Wizards are interactive tools that are used extensively in computer operating systems and applications to guide users through tasks such as installing and modifying computer programs. Relational agents are computer agents developed to form long-term, social-emotional relationships with users. An example of a relational agent is found in the virtual nurse project developed by Northeastern University computer science professor Timothy Bickmore.

A problem exists, however, in trying to apply the existing conversation-based customer support systems utilized by call centers to more robust conversational diagnostic tools. The existing systems utilized a tree-based hierarchy in organizing diagnostic information and in matching customer inquiries to that diagnostic information. In order to create the more robust conversational diagnostic tools, specialized authoring tools are required. However, in existing systems, authoring is not well integrated with the user experience. The ability to switch seamlessly back and forth between a user mode and an authoring mode is desired as is collaborative authoring, both between small and medium enterprises (SME-SME) and between small and medium enterprises and a user (SME-User).

A need also exists for an improved using experience. In existing conversation systems, it is difficult or impossible to change answers to questions, and questions that permit multiple answers are extremely difficult to handle. An improved system would facilitate changing previously submitted answers and automatically retracting solutions that were based on those changes. In addition, a system is desired where users discuss specific points in the conversational diagnostic tool with other users and SME and where users flag specific parts of the dialogue that may not be well received by customers.

SUMMARY OF THE INVENTION

Exemplary embodiments of the present invention are directed to systems and methods that diagnose problems by asking a series of questions. The identification of successive questions in the series to be asked is based on the response to previous questions in the series. The questions and responses are represented as a directed acyclic graph (DAG). By tracking a given user's traversal of the DAG, the return to an earlier point that was traversed in the decision path can be accomplished if a new response indicates that the current path is not desired, e.g., the user encounters a dead end in the system. That earlier point is an intermediary node in the DAG; therefore, a return to the start or beginning of the process is not required. Therefore, the embodiments of the present invention do not dump all the data in a corpus that is searched in its entirely at one time, i.e., without asking successive questions.

In one exemplary embodiment, the present invention is directed to a method for conducting an expert conversation by constructing a knowledge database containing a dialogue repository having a plurality of dialogues. Each dialogue represents a framework for creating at least one expert conversation and includes a plurality of nodes and a plurality of edges extending between pairs of nodes. In one embodiment, each node in each dialogue includes questions to be presented to the user, a data entry point and combinations thereof. Alternatively, each node in each dialogue includes a single question to be presented to the user.

In one embodiment, each edge includes an action undertaken in response to an answer provided by the user in response to a question contained at a node associated with that edge, to data submitted by users at a node associated with that edge and combinations thereof. In one embodiment, at least one node in each dialogue includes two or more associated edges extending from that node to two or more additional nodes. The nodes include multiple choice nodes where each multiple choice node includes a single question with a plurality of answers and where each answer associated with a given destination node linked to that multiple choice node by one of the plurality of edges. The nodes also include text classifier nodes where each text classifier node includes a text entry field and a trained text classifier to classify text entered by the user into one of a plurality of pre-defined classes where each class has an associated destination node linked to that text classifier node by one of the plurality of edges. The nodes also include text search nodes where each teach search node includes a single question and a plurality of text alternatives that are displayed in response to entered text and where each text alternative matches at least a portion of the entered text. The nodes include decision nodes where each decision node includes logic to determine a destination node linked to that decision node by one of the plurality of edges based on at least one of data and answers entered by the user at nodes other than that decision node.

In one embodiment, construction of the knowledge database also includes using a plurality of authors to collaboratively author the plurality of dialogues. Constructing the knowledge database further includes restricting permission to modify specific portions of one or more dialogues to predetermined authors and tracking modifications to each dialogue with respect to authorship. Constructing the knowledge database can also include using a web-based dialogue authoring tool running on a computing system to provide for author access to the dialogues in the knowledge database where the web-based dialogue authoring tool is in communication with the knowledge database and at least one web browser.

This method also includes using the dialogue repository in combination with a runtime dialogue system executing on a computing system and in communication with the knowledge database to conduct the expert conversation between the runtime dialogue system and a user based on a given dialogue selected from the plurality of dialogues. This is accomplished by presenting comments and questions derived from nodes in the given dialogue to the user, inputting data from the user in response to the presented comments and questions and identifying appropriate edges at each node based on the inputted data. The expert conversation is a directed acyclic graph constructed from the nodes and edges of the selected dialogue.

In one embodiment, using the dialogue repository and runtime dialogue system to conduct the expert conversation includes identifying one of the plurality of dialogues in the dialogue repository, using the runtime dialogue system to present at least one of comments and questions from nodes within the identified dialogue to a user, entering input from the user in response to the presented comments and questions and selecting edges to move between nodes based on the entered input. In one embodiment, a graphical user interface is used to display to the user a current state of each expert conversation, a sequence of answers and entered data that constitutes the expert conversation, a list of instructions, a list of questions, a request for data entry box, a request for submission of comments and combinations thereof. In one embodiment, the graphical user interface includes a graphical display of the directed acyclic graph of each expert conversation.

The method also provides for changing previously inputted data from the user and modifying the directed acyclic graph of the expert conversation in response to the change in the previously inputted data. In one embodiment, all of the presented comments and questions from the nodes and the inputted data from the user for each expert conversation are logged. In addition, interactions between the user and additional users that participated in previous expert conversations based on the identified dialogue are facilitated. In to facilitate these interactions, a set of conversation states for each previous expert conversation that was based on the identified dialogue are stored and at least one of the additional users is associated with each stored set of conversation states. A success metric is assigned to each stored set of conversation states. Each success metric measures a degree of success accomplished by the previous expert conversation associated with the stored set of conversation states to which it has been assigned. The user is provided access to each set of stored conversation states, and real-time conversations between the user and the additional users associated with the stored sets of conversation states are facilitated.

In one embodiment, the expert conversation includes at least one active thread. Each active thread includes a sequence of nodes traversed by the user in the expert conversation starting from one of a plurality of pre-defined start nodes within the identified dialogue. Using the dialogue repository and runtime dialogue system to conduct the expert conversation includes extending each active thread through the nodes and edges of the identified dialogue. In one embodiment, the expert conversation includes a plurality of simultaneously active threads. The method also includes inactivating any active thread that traverses a node in the identified dialogue previously traversed by another active thread.

Exemplary embodiments of the present invention are also directed to a method for conducting an expert conversation that uses using a dialogue runtime system running on a computing system to select a sequence of nodes derived from a dialogue containing a plurality of nodes and edges between the nodes that is stored in a knowledge database in communication with the dialogue runtime system. Each node in the dialogue includes one or more child nodes, and at least one node in the dialogue includes two or more parent nodes. A sequence of questions is presented to a user in a web-based browser. Each question in the sequence is derived from a node in the selected sequence of nodes. Subsequent nodes in the sequence are based upon answers provided from the user in response to the present sequence of questions, and a conversation thread is displayed to the user. The conversation thread is a directed acyclic graph that includes the selected sequence of nodes. The expert conversation includes this conversation thread. In one embodiment, at least one selected subsequent node in the selected sequence of nodes includes a first previously traversed node that is a parent node of a second previously traversed node in the selected sequence. The first previously traversed node includes an intermediate node in the dialogue between start nodes and end nodes in the dialogue. Therefore, the user is able to go back to an earlier node in the sequence at any time during the conversation and alter the conversation to take a different through the nodes.

DETAILED DESCRIPTION

Figure 1:
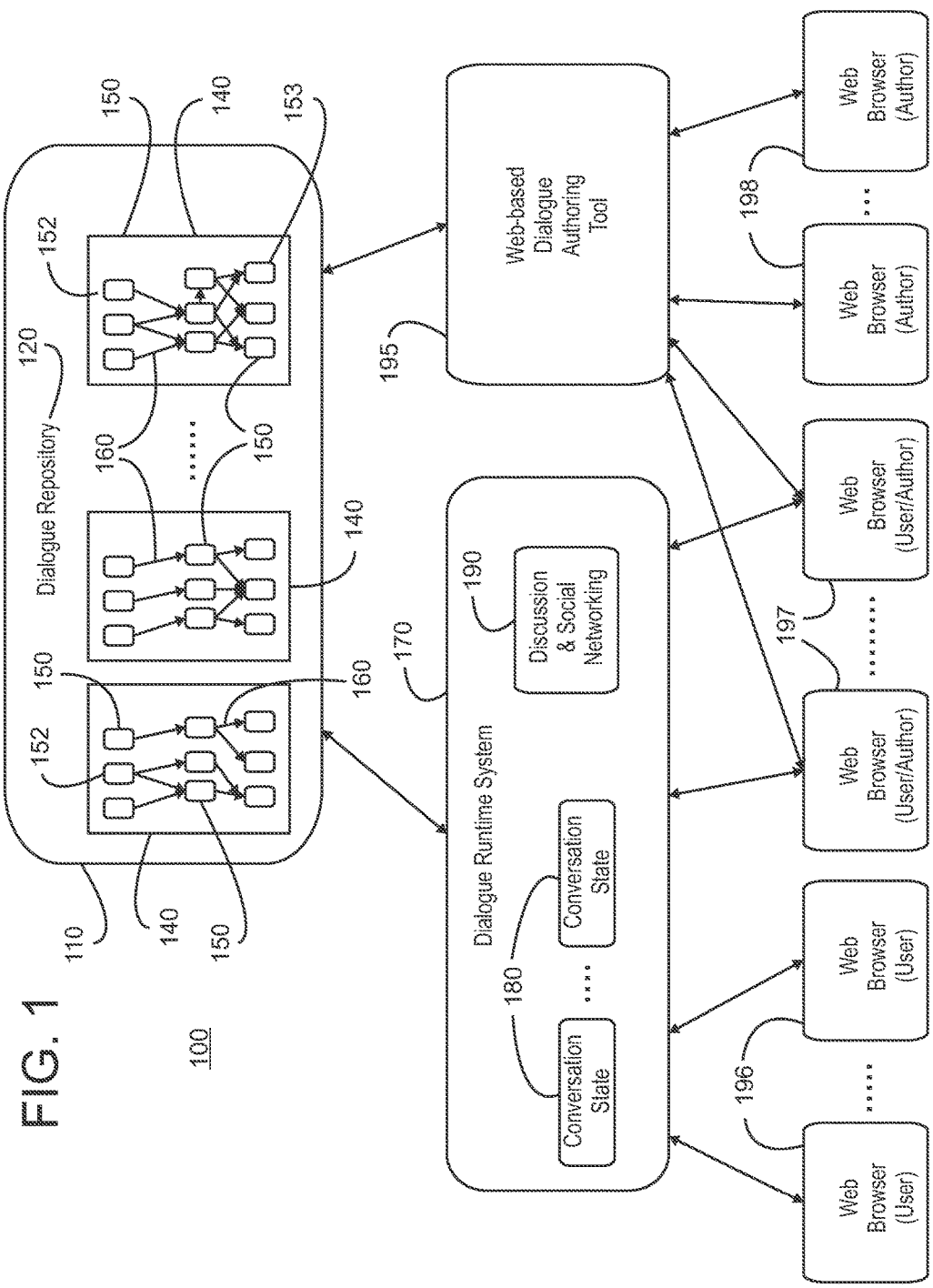
FIG. 1 is a schematic representation of an embodiment of an expert conversation builder system in accordance with the present invention.

Exemplary embodiments of systems and methods in accordance with the present invention are directed to web-based, collaboratively authored, expert conversation builder systems with special features to facilitate diagnostic procedures. These expert conversation builder systems provide for both the authoring and the conducting of interrogative dialogues. The present invention provides an expert conversation system that can be used to provide, for example, customer and technical support services and diagnostic tools either directly to a customer or to support personnel that interface with the customer. The expert conversation system provides support and other services in a format that mimics conversations with human support staff and human experts. Through the use of a conversational like interface, the support or information required by a given user can be refined and identified while reducing costs, e.g., employee, monetary and computational costs, associated with each customer interaction. The expert conversation builder systems in accordance with the present invention can be used in any application where customer support, technical support or diagnostics are desired. The expert conversation builder of the present invention mimics conversations with experts and interacts with users to refine results. By using the expert conversation builder, the costs associated with interactions between users and support providers are reduced.

Systems and methods in accordance with the present invention can be used to conduct any type of help desk session, technical support session or diagnostic session where a user or customer is trying to obtain some desired information from a company or one company is trying to obtain some desired information from another company. In one embodiment, the systems and methods of the present invention are interfaced through a computer or web-based interface with the technical or computer service personnel. In this embodiment, these personnel actually interface with the user or company representative requesting the desired information. Therefore, the systems and methods of the present invention support or enhance a typical live talk or chat session by directing and structuring the expert conversation for this session. Alternatively, the systems and methods of the present invention can be used in conjunction with one or more computing systems and a user interface such as a web-based interface to provide a session between the computing system and the user or company representative. In this case, only one live person participates in the session, and the systems and methods of the present invention through both the computing system and interface direct and structure the desired expert conversation.

The diagnostic processes of the present invention create expert conversations that are formed by a sequence of questions, instructions and data entry prompts. The present invention does not use a text-based search through a large repository of data or information. Sequencing and ordering are utilized to drive the expert conversation to the desired outcome for the user. The directed acyclic graph (DAG) structures of the present invention facilitate the desired sequencing and ordering structure of the present invention that is not found in text-based searches over large data repositories or in systems that use simple tree-based hierarchies. An additional benefit of the DAG structural is the ability to revisit and correct previous answers and entries in the expert conversation and to display to the user the full sequence of questions, answers and data submissions that yielded the current active step in the expert conversation or diagnostic process. By incorporating a user interface, such as a computer interface, web-based interface or graphical user interface (GUI), both text and images can be displayed to each user during the expert conversation. The present invention also provides for authoring of each dialogue from which a given expert conversation is derived. A plurality of authors can work independently on different portions of each dialogue, including on portions expressly reserved for modification or editing by one or more authors. Therefore, the repository of dialogues and each single dialogue can be created in a collaborative environment with contributions from multiple authors.

Referring initially to FIG. 1, an exemplary embodiment of the system 100 for use in authoring and conducting expert conversations in accordance with the present invention is illustrated. The system 100 includes at least one knowledge database 110. The knowledge database 100 resides on any suitable computer-accessible storage medium. Such storage mediums are generally known and available in the art and include, for example, hard disk drives, optical drives, network storage devices, read only memory, random access memory, electrically erasable programmable read-only memory and flash memory, among others. Preferably, the knowledge database is in non-volatile computer readable memory. Although a single knowledge database is illustrated, a plurality of knowledge databases can be used. In one embodiment, the knowledge database also contains a log or history of all expert conversations created by the system.

Located within the knowledge database is at least one dialogue repository 120. All of the entered, collected and authored information, data or knowledge is organized and stored in the dialogue repository to be accessible for purposes of constructing and conducting expert conversations. The dialogue repository 120 is organized according to the subject matter of the expert conversation that is generated. In one embodiment, the dialogue repository 120 includes a plurality of dialogues 140, and each dialogue contains the elements necessary to construct one or more expert conversations, which include concurrent expert conversations, related to a predefined area or subject matter. For example, dialogues can be provided for expert conversations related to providing technical support for a given product or products, to providing assistance in diagnosing a pre-defined class or group of problems or to providing sales support for a particular class of goods, among others.

Each dialogue 140 contains the building blocks required to construct the desired expert conversations. These building blocks are a plurality of nodes 150 and a plurality of edges 160 extending between and connecting the nodes. In one embodiment, the nodes and edges are arranged as a DAG. As used herein, the DAG is a directed graph with no directed cycles. It is constructed by a plurality of nodes and a plurality of directed edges between the nodes. Each edge connects two nodes such that no path beginning at a first node can follow a sequence of edges that returns to that same first node.

The DAG architecture of the dialogues of the present invention provides an improvement over the decisions tree architectures of conventional systems. While it appears that both kinds of architectures can be used to facilitate a question and answer type of system to acquire information, draw conclusions and provide information, the DAG architecture provides a sequencing and ordering aspect that is a benefit when conducting diagnostic and technical support. Diagnostic dialogues have a strong element of ordering. In order to diagnose a problem, steps need to be taken in a specific order. For example, hardware problems are evaluated before turning to an evaluation of potential software problems. Decisions trees, however, represent a set of questions that could be asked in any order. In a DAG, unlike in a tree structure, a given node can have more than one parent node. In a tree structure, by definition, only one parent is allowed for each node. Using a DAG architecture as opposed to a typical decision tree architecture for modeling an expert conversation signifies changes to the book-keeping mechanism in the back-end management.

With regard to other collaborate authoring systems such as a wiki-type system, wiki is used for generating unstructured text and does not generate any structure model, i.e., DAG or tree, for emulating an expert conversation. Unlike wiki, the authoring facility of the present invention generates not just text but also a DAG model behind the text for emulating conversation on the subject between the user having an issue and a customer service representative.

In the traditional conversation management system, a single path to reach a situation or question is assumed. Therefore, the tree structure was sufficient to model a conversation where each node represents a question and a link from a parent node to a child node represents a transition from one question to the next. This assumption, however, fails to cover all types of conversations. In an actual conversation, a given situation or question can be arrived at through different paths. Moreover, during a phone call with a customer service representative, the representative may return from the current point in the conversation to a previous point in order to probe alternative or parallel paths of questioning. This ability improves the effectiveness of resolving the issues in a limited time over the phone or other channels. While a tree hierarchy structure does not provide for this functionality, the DAG architecture of the present invention provides this functionality in a web-based system.

The expert conversation system of the present invention includes an elaborate book-keeping system that records and updates the detailed status of conversations in multiple concurrent threads, i.e., multiple concurrent expert conversations representing multiple paths in a DAG. Users are permitted to revisit previous nodes, i.e., answers and data submissions, in the current expert conversation and to modify those answers or data submissions as desired. The status of the expert conversation in the book-keeping system is updated when an answer or data entry is changed. The DAG architecture allows multiple answers to a single question, causing the expert conversation to fork into multiple concurrent threads. This ability to have multiple concurrent threads in a dialogue, each representing an expert conversation, significantly impacts the effectiveness of issue resolution.

Within the dialogue repository of the present invention, the nodes in the dialogue are each provided with an identifying text string referred to as the subject of that node. The node subjects identify the region of a dialogue containing a given node. The node subjects are organized as a containment hierarchy such that certain subjects can contain other subjects, i.e., certain subjects are a subset of other subjects. For example, a question asking if a computer is running is associated with a computer subject and under that subject are nodes that have either a hardware subject or a software subject. Therefore, based on the answer to the computer subject node questions, either a hardware subject node or a software subject node is presented to the user. Each of the subjects can be further segmented into detailed subjects, e.g., the software subject includes operating system, network system, a web browser program and a word processor program, among others. Each node, i.e., question or data entry point, in a DAG that models an expert conversation is associated with one or more subjects. Therefore, along with the DAGs that model an expert conversation, the present invention utilizes a parallel universe of subjects that segment the conversation space.

This subject segmented conversation space can be used to facilitate the authoring of dialogues by providing an organization structure for selecting and positioning nodes in the dialogue. In one embodiment, sections of the dialog are reserved by subject at authoring time. For example, one author covers only hardware subjects and another author covers only software subjects. Only the designated authors can create and modify nodes that fall within their respective subjects. Subject based reservations can be used to reserve an entire subject or any of the subordinate subjects to a given author so that no other authors can use those reserved subjects. Since the subjects are nested, a single reservation of a relatively high level subject covers a wide area or grouping of nodes. Node based reservations can also be used where a node can be locked by an author to ensure that no further connection can be made from that node. Version control is maintained at the dialogue level.

Detection of unintended duplicates in node content is facilitated by retrieving nodes by subject. In addition, at runtime, i.e., during the creation of expert conversations based on the dialogues, experienced customer service representatives do not start at designated start nodes but can skip or move ahead to intermediate nodes that pertain to a specific subject that the customer service representative recognizes as pertinent to the present expert conversation. Therefore, the expert conversation commences using nodes that are part of the identified subject.

Each node can have a plurality of associated edges 160. These edges include a plurality of incoming edges and a plurality of outgoing edges. In addition, one or more of the nodes in each dialogue can have a plurality of parent nodes. The nodes include designated starting nodes 152 where expert conversations based on the subject matter of that dialogue begin and ending or terminal nodes 153 where expert conversations based on the subject matter of that dialogue end. The structure of the nodes and edges in each dialogue provides for the creation of a plurality of expert conversations including a plurality of simultaneous expert conversations.

In general, the nodes can be viewed as turning points in the expert conversation and are used to provided information to the user and to extract information from the user that extends or advances the expert conversation. Each node has an associated function in the exchange of information between the user and system for purposes of conducting the expert conversation. These functions include data entry, query nodes where a question is presented to the user, instruction nodes and combinations thereof. The nodes include multiple choice nodes, text classifier nodes, text search nodes, decisions nodes and combinations thereof.

A multiple choice node contains a single question that is presented to the user or company personnel and several alternatives as a possible answer to that question. Each displayed answer is associated with a different edge that extends the expert conversation to another predetermined destination node in the dialogue. The user selects one or more of the alternatives. A text classifier node contains a single question that is displayed to the user in combination with a text entry box. Text entry boxes in a windows or graphical user interface environment are known and available in the art. The user enters text in the text entry box that is responsive to the displayed question. A text classifier that has been created or trained to respond to the entered text and to process that entered text into one or more classes is associated with each text entry box. An edge is associated with each text class, and each edge is associated with a destination node. Entered text is classified, and the expert conversation is advanced along the edge associated with the identified text class.

A text search node is similar to a multiple choice node; however, the number of alternative answers is too great to be displayed on a single screen. A single question is presented with a text entry field. As text is entered into the field, matching alternatives are displayed to the user. The user can select one or more of the displayed alternatives. Each alternative is associated with an edge that leads to a destination node. A decision node does not contain any questions to be displayed. The selection of an appropriate edge and destination node is based upon answers to other node questions. A script or some other logical formula is used to determine the selection of the appropriate edge. Instruction or information nodes provide instructions or information to the user for purposes of further diagnosis, answering a user query or repairing equipment, among others. The instruction nodes display the information as text, figures, videos or combinations thereof. The expert conversation can then be extended when the user finishes reviewing the displayed information. The edge chosen and the destination node can be chosen based on answers or data provided at previous nodes. The destination node can also be selected based on responses to answers or data entry prompts provided with the information.

An expert conversation is created beginning at a predefined start node of a given dialogue and proceeding across edges through a string of nodes. Therefore, each expert conversation forms a DAG through a given dialogue. As an expert conversation is extended, it traverses additional nodes in the dialogue. The edges 160 are the links that contain the actions that advance the nodes between nodes. These actions are based on data provided at the node associated with the edge or at any other node within the dialogue.

The expert conversation system 100 also includes a dialogue runtime system 170. The dialogue runtime system is executing on one or more computing systems and is structured to include a conversation state 180 for each expert conversation that is created using the dialogues in the dialogue repository. The dialogue runtime system 170 is also in communication with a plurality of user-associated web browsers 196. The web-browsers are executing on customer premises equipment such as computers or other web-enabled devices that can support the appropriate graphical interface. Therefore, users 196 use their associated web browser to interface with the knowledge database 110 and to engage in expert conversations through the dialogue runtime system. The dialogue runtime system presents information and queries to the users, accepts answers and data from the users and builds and maintains the appropriate expert conversations. This includes creating, maintaining and saving the DAG associated with each expert conversation.

The dialogue runtime system also includes a discussion and social networking function that allows users and company personnel to communicate with each other to share knowledge and to share previous expert conversations based on common subject matter. A web-based dialogue authoring tool 195 is provided in communication with the knowledge database and in communication with a plurality of web browsers or other graphical interfaces that are associated with authors 198 of the dialogue repository. The authors 198 use the web-based authoring tool 195 to enter knowledge, data, questions and any other information required to construct one or more portions of one or more of the dialogues 140 in the dialogue repository 120. In one embodiment, the authors work collaboratively to enter the desired data and to construct the nodes and the edges of each dialogue. The dialogues are updated over time as more data and knowledge are gathered. Dialogues can also be updated in response to the outcomes of previous expert conversations and in response to data received from users during previous expert conversations. The authors can be provided access to all of the dialogues, or the dialogues can be restricted to access by a predetermined set of authors. In one embodiment, the knowledge database maintains a time-stamped log of all changes to each dialogue. This time-stamped log also identifies the author or authors responsible for each change or modification. In addition to users and authors, the system can also accommodate combined users and authors. The dialogue runtime system 170 and the web-based dialogue authoring tool are in communication with web browsers 197 associated with parties that can function as both users and authors. Therefore, the system integrates the tools required for both dialogue authoring and expert conversation creation.

Figure 2:
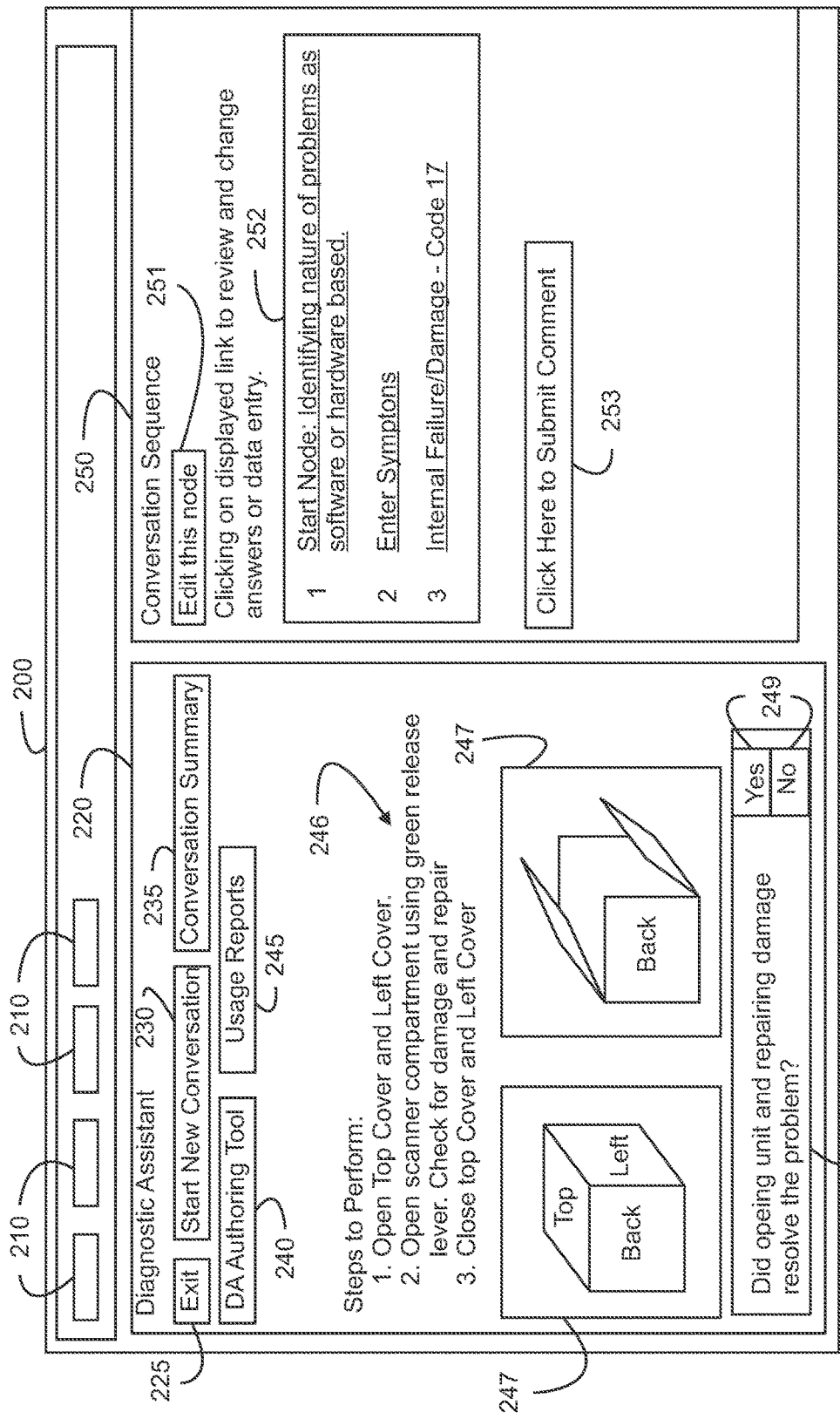
FIG. 2 is a representation of an embodiment of a diagnostic assistant window for use with the present invention.

Referring to FIG. 2, an exemplary embodiment of a diagnostic assistant 200 windows-based graphical interface that is displayed in any web browser of the system 100 of the present invention is illustrated. The diagnostic assistant 200 window can include all of the functionality of a window as is known and available in any windows-based operating system including different sizable and scrollable windows and a plurality of function buttons 210. In one embodiment, the diagnostic assistant 200 includes a diagnostic assistant window 220 that includes an exit button 230 for exiting the diagnostic assistant, a start new conversation button 230 for initiating a new expert conversation based on one of the dialogues, a conversation summary button 235 for displaying a conversation summary window, a diagnostic assistant authoring tool button 240 for entering the authoring mode and displaying an authoring window and usage reports button 245 for displaying usage reports. The diagnostic assistant window 220 also includes an information display 246 that can display text and figures 247 related to the current node in the expert conversation. The text includes instructions, queries and diagnostic instructions. A query window 248 or data entry window can also be provided. The query window 248 can also include one or more answer buttons 249 for entering answers to the query presented.

The diagnostic assistant 200 also includes a conversation sequence window 250 that displays a current and up-to-date sequence of the steps of the expert conversation. The conversation sequence window 250 includes an edit this node button 251 that facilitates editing or modifying the current active node of the expert conversation. A node sequence window 252 is also provided with a chronological sequence of all nodes traversed by the expert conversation including the current active node. Each traversed node in the node sequence is provided in hypertext format. By selecting a given node in the sequence using, for example, a point-and-click type input device, the user can return to that node in order to review the node, modify the data or answers entered in that node or to author or modify the content of the node itself.

A social networking button 253 is also provided in the conversation sequence window in order to provide for the submission of a comment with regard to the current active node or the current active expert conversation. The social networking button also facilitates interaction between the user of the diagnostic assistant and other users or current or prior expert conversations based on the same or a related dialogue. Therefore, the diagnostic assistant provides for all of the required interface functionality to participate in an expert conversation and to author dialogues. The social networking feature provides a built-in discussion system based around the nodes. When a user is viewing a node within a conversation, that user can make comments or suggest improvements. The system of the present invention keeps track of usage and can suggest additional users that have a similar usage pattern, i.e., make a friend suggestion. Feedback can also be provided for suggestions on improvements to node content, to report errors or bugs or for participation in discussion forums.

Figure 3:
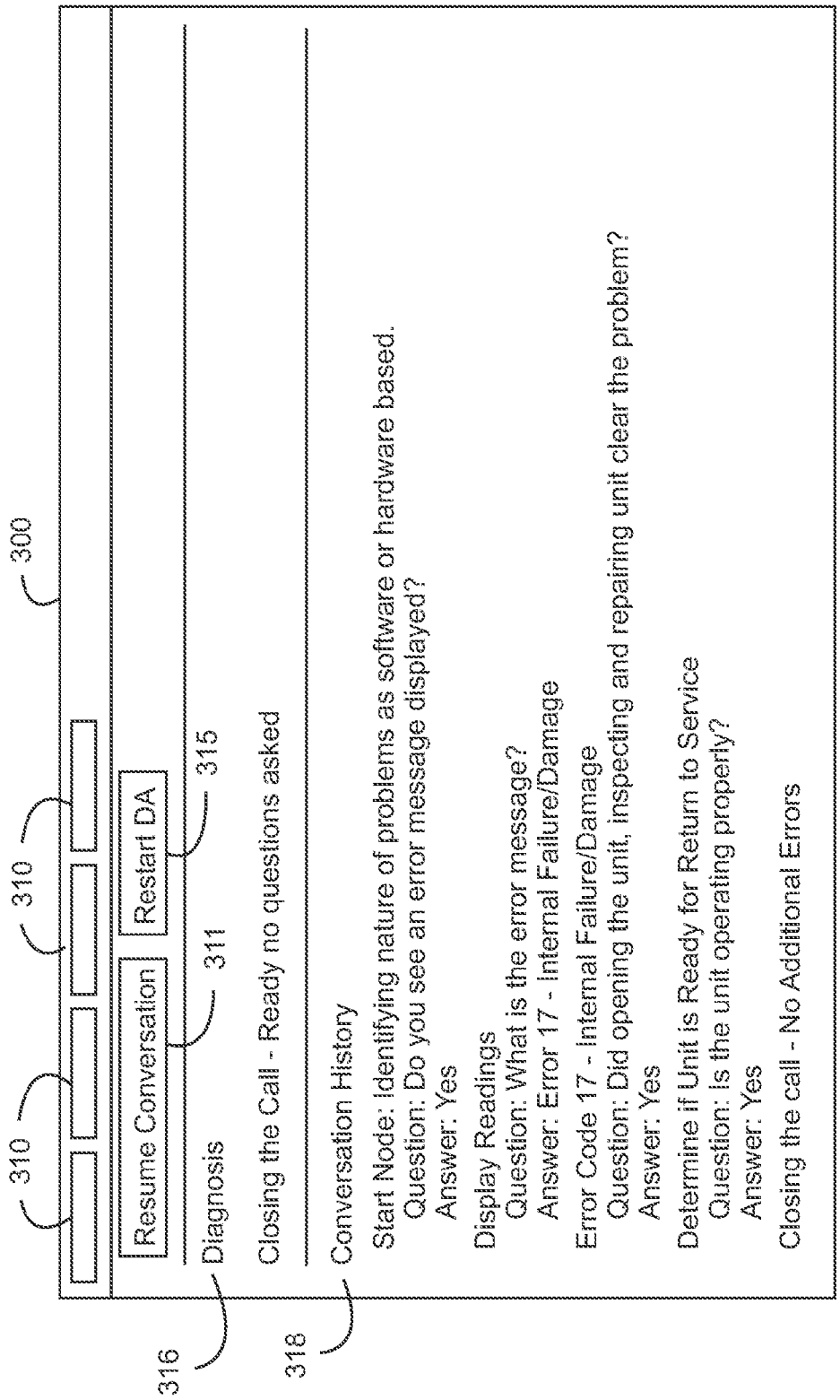
FIG. 3 is a representation of an embodiment of a conversation summary window for use with the present invention.

A summary screen can be viewed at the end of the expert conversation by selecting the conversation summary button 235. A conversation summary window 300 is presented as illustrated, for example, in FIG. 3. The conversation summary window 300 is a windows-based graphical interface that is displayed in any web browser. The conversation summary window 300 includes all of the functionality of a window as is known and available in any windows-based operating system including different sizable and scrollable windows and a plurality of function buttons 310. A full sequence of all questions, answers and data submissions are recorded for each expert conversation. The conversation summary window 300 displays the saved sequence of questions, answers and data submissions. The window includes a diagnosis section 316 that displays the final status and resolution of the call. The conversation history section 318 displays a chronological history of the call including a listing of each node traversed, the information or questions displayed by that node and the data or answers entered at each node. The conversation summary window 300 also includes a resume conversation button 311 that allows a user to activate or resume the displayed conversation and a restart diagnostic assistant button 315 that returns the user to the diagnostic assistant window for the displayed expert conversation.

Figure 4:
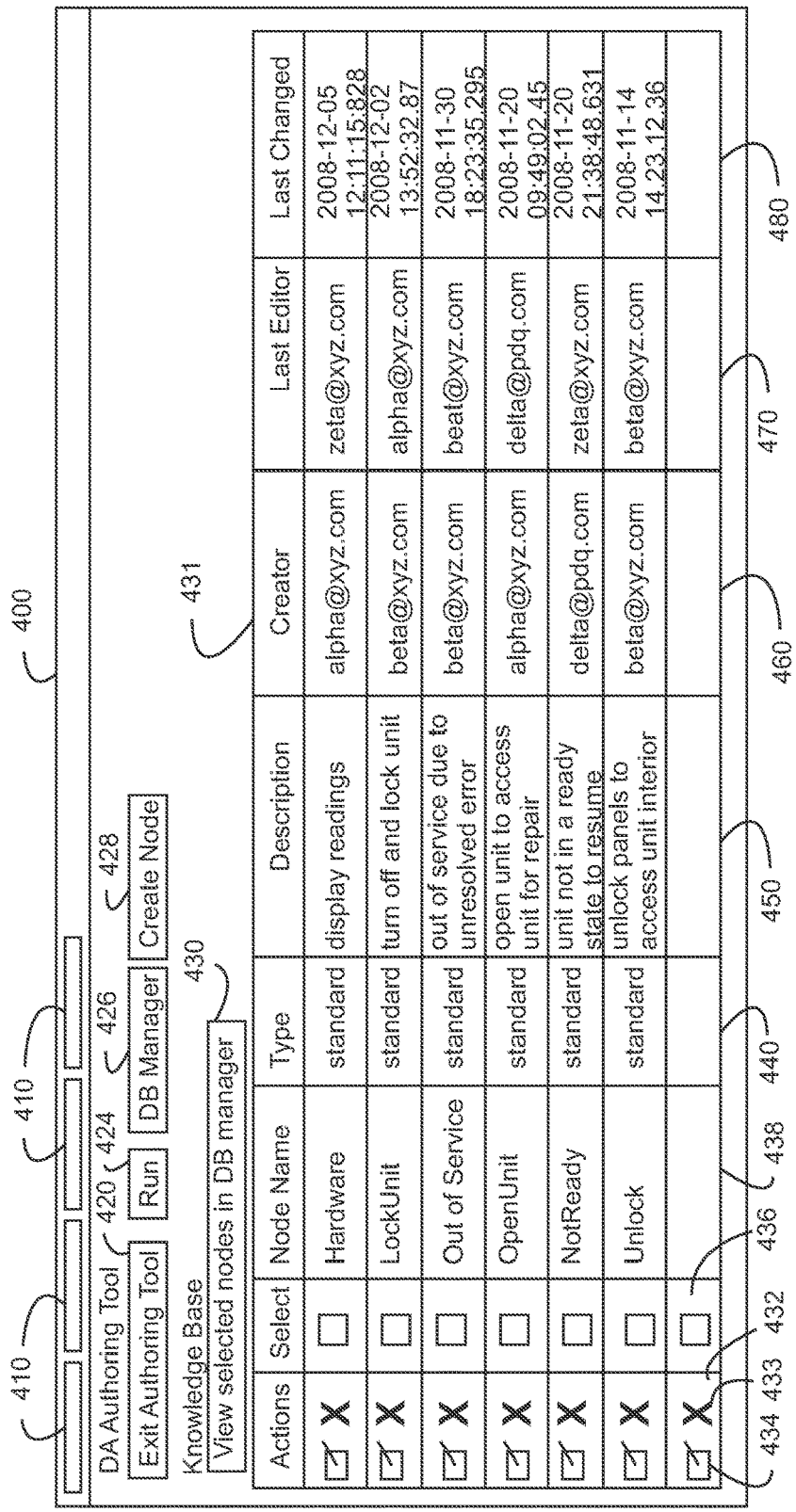
FIG. 4 is a representation of an embodiment of a diagnostic assistant authoring tool window for use with the present invention.

An authoring screen can be viewed by selecting the diagnostic assistant authoring tool button 240. A diagnostic assistant authoring tool window 400 is presented as illustrated, for example, in FIG. 4. The diagnostic assistant authoring window 400 is a windows-based graphical interface that is displayed in any web browser. The diagnostic assistant authoring window 400 includes all of the functionality of a window as is known and available in any windows-based operating system including different sizable and scrollable windows and a plurality of function buttons 410. Using the diagnostic assistant authoring tool window, an author can view nodes in the existing dialogue and relevant information for the editing of these nodes. The diagnostic assistant authoring tool window also facilitates the creation, editing and modification of each dialogue.

Included in the diagnostic assistant authoring tool is a button for exiting the authoring tool 420 and returning to the diagnostic assistant window. A run button 424 allows the author to run one or more selected nodes to check the functionality of the dialogue or portions of the dialogue. The database manager button 426 provides the author or authorized manager with the ability to view, to create and to modify the content of the knowledge database. In one embodiment, only designated mangers can create and maintain the content of the knowledge database. Each manager may be granted access to the entire knowledge database or to only a portion of the knowledge database. Modification of the nodes in the dialogues is further facilitated by the create node button 428 which initiates a process for the creation of the new node. Authoring of a given node can include an identification of the edges associated with that node. Alternatively, nodes are created and the edges between nodes are defined in the creation of a dialogue employing the nodes. The window facilitates the importing and exporting of data or content into the knowledge database. Therefore, the development of the knowledge database is separated from the production or creation of expert conversations based upon the content of the knowledge database.

Figure 5:
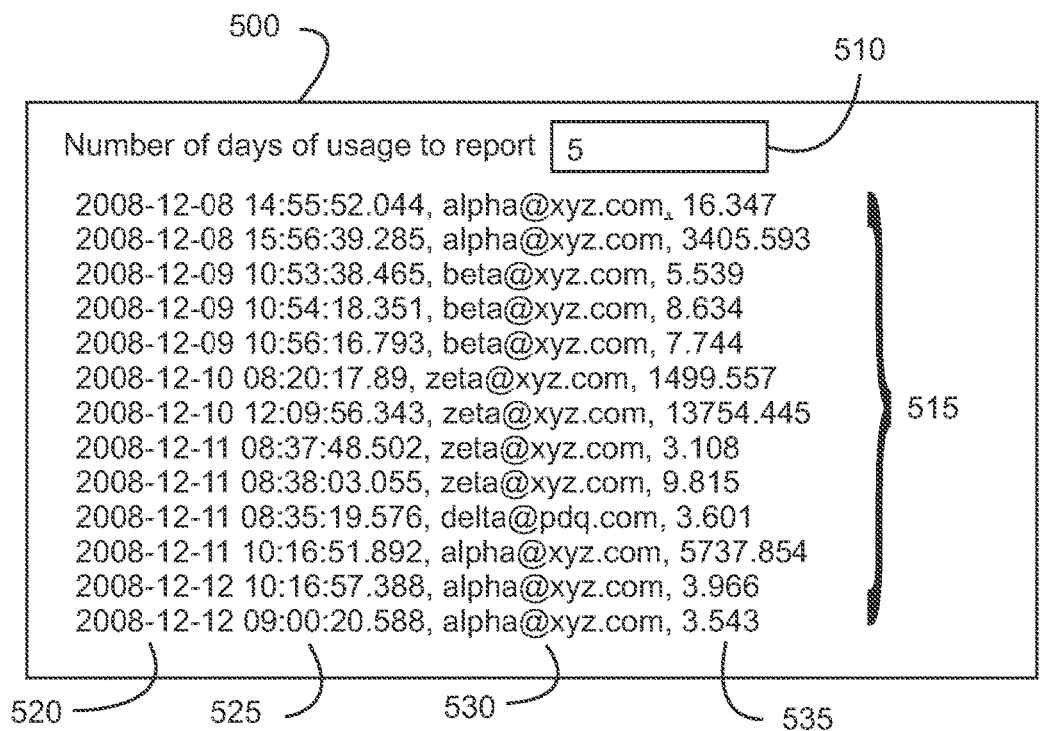
FIG. 5 is a representation of an embodiment of a usage report for use with the present invention.

By selecting the usage report button 245 in the diagnostic assistant window, a usage report 500 as illustrated in FIG. 5 is displayed. The usage report allows administrators, managers, authorized users and authors to view usage reports that provide detailed information that identifies the users of the expert conversation system and the duration of each given expert conversation. The information is provided in comma separated variable format so that is can be easily exported into spreadsheet type programs for review and analysis. The usage report 500 includes a data entry window 510 for selection of the number of days that the usage report should cover. As illustrated, the usage report covers 5 days; however, any number of days can be entered as each expert conversation is saved, for example, to the knowledge database. A chronological list 515 of each expert conversation that occurred during the selected time period is presented. Each entry in the list includes the date the expert conversation occurred 526, the time the expert conversation was initiated 525, an identification of the participant in the conversation from the company that was contacted 530, e.g., the technical support representative, and the duration of the expert conversation 535.

The diagnostic assistant authoring tool window also includes a knowledge base window portion that displays a table 431 containing the relevant information for the nodes. These can be all of the nodes in the knowledge database or all of the nodes in a given dialogue. Each node occupies a row of the table, and the table 431 includes an action column 432 that allows the author to quickly select a particular action for a given node in a given row. These actions include, for example, a delete icon 433 for deleting the node and the row of the table and an edit icon 434 for initiating an editing function for the node associated with that row in the table. One or more nodes can be selected for viewing and editing using the select column 436. Upon selecting one or more nodes, the view selected nodes in the database manager button 430 can be selected to facilitate viewing and modification of those nodes.

The table 431 also includes columns for the name of each node 438, the type of node 440, for example standard, custom, restricted, etc., and a description of the node and its functionality 450. In addition to providing information regarding the type and content of the node itself, information is maintained regarding the development of the node and the authors that contributed to the content of the node. The node authoring systems of the present invention facilitate collaborative node and dialogue development. Therefore, multiple authors can work on one or more portions of a given dialogue, including one or more nodes. The authors can work independently and simultaneously on a given portion of a dialogue or a given node. The table maintains editing information in a column for the creator of a given node 460, a column for the last editor of a given node 470 and a display of the last time a given node was edited 480. As illustrated, the authors are identified by their electronic mail addresses. This facilitates communication among the authors. Other types of contact information, for example cellular phone numbers for text-based communications, can also be displayed. In one embodiment, the author information is provided in hypertext format to facilitate the initiation of a communication session with that author.

Figure 6:
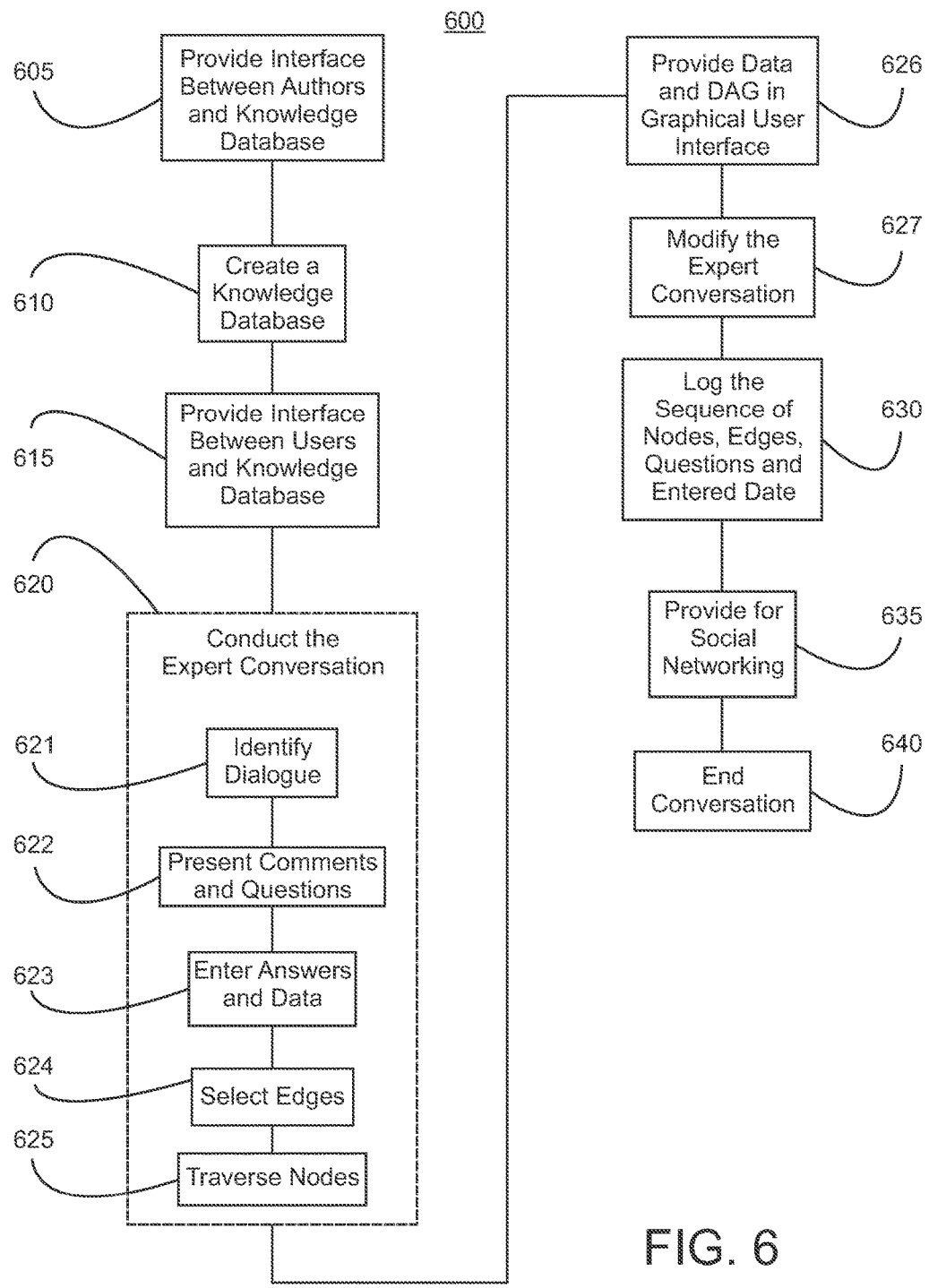
FIG. 6 is a flow chart illustrating an embodiment of a method for conducting an expert conversation in accordance with the present invention.

Referring to FIG. 6, in accordance with one exemplary embodiment, the present invention is directed to a method for conducting an expert conversation 600, e.g., a telephone call, between a user and a customer support center. In this method, an interface is provided 605 between a plurality of authors and a knowledge database. In one embodiment, the author interface is a web-based interface, for example a web browser running on a computing system. A knowledge database is authored, constructed or created 610 such that the knowledge database is a dialogue repository containing a plurality of dialogues. Each dialogue represents a framework for creating at least one expert conversation and includes a plurality of nodes and a plurality of edges extending between pairs of nodes. In one embodiment, each dialogue in the repository of dialogues is arranged as a directed acyclic graph (DAG) as described above.

Each node in each dialogue can include questions to be presented to the user, a data entry point and combinations thereof. In one embodiment, each node in each dialogue contains a single question to be presented to the user. Each edge represents an action undertaken in accordance with an answer provided by the user in response to a question contained at a node associated with that edge, to data submitted by users at a node associated with that edge and combinations thereof. In one embodiment, at least one node in each dialogue has two or more associated edges extending from that node to two or more additional nodes.

Suitable nodes for inclusion in the knowledge database include, but are not limited to, multiple choice nodes, text classifier nodes, text search nodes, decision nodes and combinations thereof. Each multiple choice node has a single question with a plurality of answers, and each answer is associated with a given destination node linked to that multiple choice node by one of the plurality of edges. The user can select one or more multiple choice answers in response to the displayed multiple choice question. Each text classifier node includes a text entry field and a trained text classifier to classify text entered by the user into the test entry field. The text classifier places the entered text into one of a plurality of pre-defined classes. Each pre-defined class has an associated destination node linked to that text classifier node by one of the plurality of edges. Each text search node includes a single question and a plurality of text alternatives that are displayed in response to text that is entered by the user. Each text alternative matches at least a portion of the entered text. The user can select one or more displayed text alternatives. Each decision node includes logic to determine a destination node linked to that decision node by one of the plurality of edges based on at least one of data and answers entered by the user at nodes other than that decision node.

In order to construct the knowledge database, a plurality of authors work collaboratively to author the plurality of dialogues. In one embodiment, permission to modify specific portions of one or more dialogues is restricted to a predetermined author or set of authors. The portions are identified by node and by node subject. The modifications to each dialogue are tracked with respect to time and authorship. In order to facilitate the authoring of each dialogue or portions of the dialogues, a web-based dialogue authoring tool is provided that runs on a computing system. The web-based authoring system is in communication with the knowledge database and with at least one web-based browser associated with one of the authors. This web-based authoring system provides for author access to the dialogues in the knowledge database.

An interface is also provided between the knowledge database and users of the knowledge database 615. These users include end users that initiate conversations, e.g., phone calls or text chats, in order to obtain, for example, technical support, and customer service representatives that participate in the expert conversations with the users. This interface includes the runtime dialogue system that is running on a computing system. The runtime dialogue system is in communication with the knowledge database and with user interfaces associated with the users participating in the expert conversations. In one embodiment, the user interfaces are web-based interfaces, for example, web browsers running on a computing system.

The dialogue repository is used in combination with a runtime dialogue system to conduct the expert conversation 620. The expert conversation is conducted between the runtime dialogue system and a user based on a given dialogue selected from the plurality of dialogues by presenting comments and questions derived from nodes in the given dialogue to the user, inputting data from the user in response to the presented comments and questions and identifying appropriate edges at each node based on the inputted data. The resulting expert conversation represents a DAG constructed from the nodes and edges of the selected dialogue. In general, the runtime dialogue system asks questions, displays information and solicits input from the users. These steps correspond to start and intermediate nodes in the dialogue DAGs. The runtime dialogue system also makes statements derived from nodes in each DAG that correspond to terminal nodes. It is the users that initiate conversations at designated start nodes within each DAG. The users can answer questions, review the current state of a given conversation, change answers to previously submitted questions and interact with other users through a social networking based functionality in the runtime dialogue system.

In one embodiment, conducting each expert conversation includes identifying one of the plurality of dialogues 621 in the dialogue repository to use as the template for the expert conversation. The particular dialogue is identified based on the type of support, i.e., the subject matter, that the expert conversation covers. Each expert conversation is one or more conversation threads running through the nodes and edges of one of the dialogues. The threads traverse the nodes in a given dialogue, and extending the conversation implies traversing additional nodes. The use of conversation threads in the dialogues facilitates the creation of multiple, different expert conversations from a single dialogue.

Each expert conversation begins at a node in the designated set of start nodes. In a given expert conversation thread, an active node is a node having a question or statement that can be displayed to the user. Multiple nodes can be active at any given point in an expert conversation. Depending on the arrangement of the questions and system policies governing the display of questions, a subset of the questions may be displayed to each user. As questions are answered or data are entered, edges are selected and the expert conversation thread advances to the next node or nodes. The nodes containing the answered questions or data entry boxes are said to be traversed. Two or more expert conversation threads may exist in a single expert conversation or each expert conversation thread may be related to a single expert conversation. Each expert conversation thread remains active until the last node in the thread is answered or otherwise disposed.

The state of a given expert conversation contains all of the answers to questions supplied by the dialogue runtime system and all data otherwise entered by a user. The expert conversation threads are stored in the order of creation. This ordering facilitates the implementation of various question asking strategies. The expert conversation threads make altering the state of a given expert conversation easier as the user changes a previously submitted answer to one of the questions in one of the expert conversation threads. The consequences of every answer are fully captured in the set of conversation threads associated with a given expert conversation and can be applied across all of the expert conversation threads in the set. Any given expert conversation thread can be easily truncated or terminated, for example, based on another one of the concurrent expert conversation threads. For example, an answer in one expert conversation thread may make another expert conversation thread unnecessary or superfluous. The use of expert conversation threads running through a given dialogue allows the system of the present invention to create an easy-to-understand narrative that informs the user about the path of questioning that resulted in the traversal of a given node. Browsing the history of a conversation is made easier, because a user can view all the threads in a conversation state. Without expert conversation threads, all of the nodes and edges in a given dialogue would have to be displayed as opposed to just the nodes and edges traversed by a given expert conversation thread.

Having identified the dialogue to be used in the creation of the expert conversation, at least one expert conversation thread or alternatively a plurality of expert conversation threads are created. Each thread begins at one of the designated start nodes and traverses through the nodes in the dialogue. In one embodiment, the runtime dialogue system is used to present at least one of comments and questions from nodes within the identified dialogue to a user 622. Input from the user in response to the presented comments and questions is then entered 623 into the dialogue runtime system. Based upon the entered answers and date, edges are selected to move between nodes based on the entered input 624. This display of node content, entering of data and selection of edges causes each expert conversation thread to draw a path that traverses through the nodes of the dialogue 625.

These paths through the nodes are the expert conversation threads and are displayed to the user using a graphical interface 626. This graphical interface includes a windows-based graphical interface and includes an illustration of the DAG that represents each expert conversation thread as well as the entire expert conversation and any additional text and graphical displays related to the current expert conversation. For example, the graphical user interface displays to the user a current state of each expert conversation, a sequence of answers and entered data that constitutes the expert conversation, a list of instructions, a list of questions, a request for data entry box, a request for submission of comments and combinations thereof. An example of a suitable graphical interface is the diagnostic assistant window illustrated in FIG. 2. Another suitable graphical interface is the DAG graph containing a plurality of expert conversation threads as shown, for example, in FIG. 7.

In one embodiment, each expert conversation includes at least one active thread where each active thread is a sequence of nodes traversed by the user in the expert conversation starting from one of a plurality of pre-defined start nodes within the identified dialogue. Use of the dialogue repository and runtime dialogue system to conduct the expert conversation includes extending each active thread through the nodes and edges of the identified dialogue. In one embodiment, each expert conversation includes a plurality of simultaneously active threads. Any active thread that traverses a node in the identified dialogue previously traversed by another active thread is inactivated, preserving the structure of the DAG.

Returning to FIG. 6, methods for creating expert conversations in accordance with the present invention utilize the expert conversation threads in combination with the other information and functionalities provided by the graphical interface to modify an existing expert conversation thread 627 by viewing and changing previously inputted data from the user and modifying the affected expert conversation threads in the directed acyclic graph of the expert conversation in response to the change in the previously inputted data. All of the presented comments and questions from the nodes, the inputted data from the user for each expert conversation and the DAG for each expert conversation thread are logged to a database 630, for example the knowledge database. This log includes a list of the sequence of all questions and answers for each expert conversation thread, the time the expert conversation was initiated, the duration of the expert conversation and the user or users associated with the expert conversation.

The log is used to facilitate interactions between the user and additional users that participated in previous expert conversations based on the identified dialogue 635 or on related subject matter. This is the social networking aspect of the expert conversation system of the present invention. Each user has access to the experiences and knowledge of all previous users of the system. In one embodiment, facilitating interactions among users includes storing a set of conversation states for each previous expert conversation that was based on the identified dialogue or a related subject matter and associating at least one of the additional users with each stored set of conversation states. A success metric, i.e., a measure of the successfulness of a given expert conversation, is assigned to each stored set of conversation states. Each success metric measures a degree of success accomplished by the previous expert conversation associated with the stored set of conversation states to which it has been assigned. The current user is provided with access to each set of stored conversation states which are used to facilitate real-time conversations between the user and the additional users associated with the stored sets of conversation states.

When all of the expert conversation threads have reached terminal nodes or the expert conversation has otherwise reached a conclusion by solving an issue to the user's satisfaction or by exhausting all possible alternatives in trying to solve the issue, the expert conversation ends 640.

In one exemplary embodiment, the present invention is directed to a method for conducting an expert conversation where the dialogue runtime system running on a computing system is used to select a sequence of nodes derived from a dialogue containing a plurality of nodes and edges between the nodes that is stored in a knowledge database in communication with the dialogue runtime system. Each node in the dialogue includes one or more child nodes and at least one node in the dialogue includes two or more parent nodes. A sequence of questions is presented to a user through a web-based browser. Each presented question in the sequence is derived from a node in the selected sequence of nodes.

Each subsequent node in the sequence of nodes is selected based upon answers provided from the user in response to the present sequence of questions. In one embodiment, at least one selected subsequent node in the selected sequence of nodes includes a first previously traversed node that is a parent node of a second previously traversed node in the selected sequence. This first previously traversed node is an intermediate node in the dialogue between start nodes and end nodes in the dialogue. Therefore the expert conversation system has the ability to return to previously answered nodes in an expert conversation thread. The conversation thread, which is a DAG, is displayed to the user and includes the selected sequence of nodes and the expert conversation includes the conversation thread.

Figure 7:
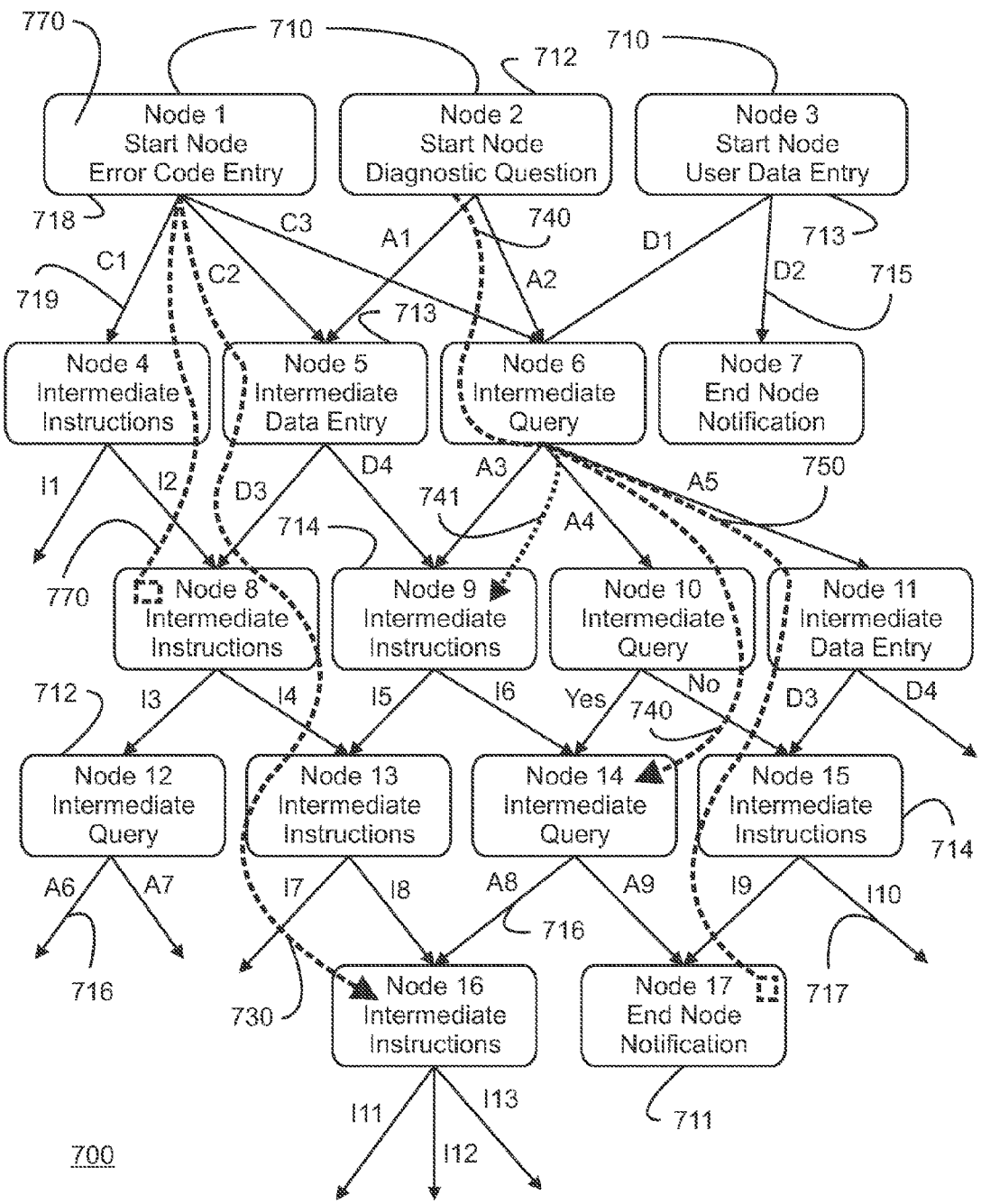
FIG. 7 is an illustration of an embodiment of a dialogue illustrating a plurality of expert conversation threads in accordance with the present invention.

Referring to FIG. 7, an illustration of an embodiment of multiple expert conversation threads in given dialogue 700 in accordance with the present invention is illustrated. As described above, the dialogue includes a plurality of nodes and a plurality of edges extending between the nodes. The plurality of nodes includes a plurality of designated start nodes 710 and a plurality of designated terminal nodes 711. All of the other nodes are referred to as intermediate nodes. The nodes include error code entry nodes 718 that are multiple choice nodes having a plurality of code entry edges 719 extending from those nodes, diagnostic question or query nodes 712 that are multiple choice questions having a plurality of answer edges 716 extending therefrom, data entry nodes 713 having a plurality of data entry edges 715 extending therefrom and instruction nodes 714 that display instructions and have either associated queries or data entry requests and have a plurality of instruction edges 717 extending therefrom. The terminal nodes are notification nodes and do not have edges extending therefrom.

An expert conversation is constructed from a plurality of expert conversation threads that are initiated by users at one of the start nodes in the dialogue. A first thread 770 initially begins at Node 1 where the user is prompted to enter error codes. Two error codes are entered, signifying two edges and bifurcating this first thread into a first thread 770 and a first thread clone 730 that extend to Nodes 4 and 5 respectively. Although illustrated as having a single clone, a given thread can be cloned into more than two clones. Concurrently, a second thread 740 of the expert conversation is initiated at Node 2. A single answer is selected and the second thread advances to Node 6. At Node 6, two answers are selected, bifurcating this second thread into the second thread 740 and a second thread clone 750. All four threads are extended by traversing a path through the nodes as illustrated. The user answers questions and provides input as prompted by each node. A thread list provides the path of nodes for each expert conversation thread in Table 1. As nodes are cloned, the new clones are added to the table, which includes a list of all threads in the expert conversation.

TABLE 1

Thread List for Expert Conversation

| Step | Thread 1 | | | Thread 2 | |
| --- | --- | --- | --- | --- | --- |
| 1 | | (1) | | | (2) |
| 2 | (1, 4) | (1, 5) | | | (2, 6) |
| 3 | (1, 4, 8) | (1, 5, 8) | (2, 6, 10) | | (2, 6, 11) |
| 4 | — | (1, 5, 8, 13) | (2, 6, 10, 14) | | (2, 6, 11, 15) |
| 5 | — | (1, 5, 8, 13, 16) | (2, 6, 10, 14) | | (2, 6, 11, 15, 17) |
| 6 | — | (1, 5, 8, 13, 16) | (2, 6, 9) | | — |

Each expert conversation thread remains active until it traverses an end node, traverses a previously traversed node, reaches a resolution or is deemed to not be able to reach a resolution. The first thread clone 730 extends from Node 5 to Node 8, Node 13 and Node 16. This thread remains active as one or more instruction edges have not been selected from Node 16. The first thread 770 extends from Node 4 to Node 8. As this occurs following the traversal of Node 8 by the first thread clone 730, the first thread 770 becomes inactive. The second thread 740 traverses Node 6 through Node 10 to Node 14 and is still active as no answer has been provided for the query of Node 14. The second thread clone 750 extends from Node 6 through Nodes 11 and 15 and to Node 17. The second thread clone 770 becomes inactive at Node 17, which is a terminal node.

Users of the expert conversation system of the present invention have the ability to change previously submitted answers to questions. For example, a user may not have observed a symptom properly or may have inadvertently entered the wrong answer. The user can review the history of the expert conversation as displayed in the DAG of FIG. 7 and Table 1. The user then changes the answer for a given expert conversation thread at a selected node. The expert conversation system truncates threads corresponding to the deleted answers, removes duplicate threads and extends the expert conversation thread in accordance with the revised answer or data. As illustrated in FIG. 7, the answer provided for the second thread 740 at Node 6 is changed, and the answer edge leading to Node 9 is selected. This creates an alternative second thread 741 and will remove the second thread that is traversing Nodes 10 and 14. This is also reflected in Step 6 of Table 1.

An issue that arises in reviewing and changing answers is the creation of duplicate threads. For example, if the second thread had traversed the nodes as (2, 6, 10, 14) and the second thread clone traversed (2, 6, 10 15), changing the answer at Node 6 would result initially in the truncating of both threads to (2, 6). This creates duplicate threads, and the second thread clone is deleted.

Each expert conversation can have multiple concurrent active threads due to the existence of multiple start nodes and multiple answer nodes. Every active thread can contribute a question or display information to the user in the expert conversation. In one embodiment, a question selection policy is used to determine how many questions are displayed to the user at a given time and to select the questions or information that is displayed to each user. The question selection policy is orthogonal to the thread maintenance algorithm. Suitable policies include, but are not limited to, showing one question at a time for a given thread until that thread can no longer be extended before switching to another thread, showing all possible questions from all active expert conversation threads or selecting questions based on the current state of the expert conversation. Since the list of active conversation threads stores threads in the order of creation, one policy could select questions based on a first in first out (FIFO) or a last in first out (LIFO) manner.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one embodiment, the present invention is directed to a machine-readable or computer-readable storage medium containing a machine-executable or computer-executable code that when read by a machine or computer causes the machine or computer to perform a method for conducting an expert conversation in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for conducting an expert conversation, the method comprising:
   constructing a knowledge database comprising a dialogue repository comprising a plurality of dialogues, each dialogue representing a framework for creating at least one expert conversation and comprising a plurality of nodes and a plurality of edges extending between pairs of nodes, by identifying a subject for each node and associating an identifying text string with each node, the identifying text string comprising the identified subject for each node;
   grouping the nodes by common subject; into a plurality of node groups, each node group associated with a given subject;
   identifying containment hierarchies among the subjects, each containment hierarchy comprising a subset relationship between a given pair of subjects;
   organizing the node groups in the knowledge database in accordance with the containment hierarchies; and
   using the dialogue repository in combination with a runtime dialogue system in communication with the knowledge database and executing on a computing system that is in communication with an expert and a user to use the knowledge database to conduct a live expert conversation between the expert and the user using the plurality of nodes in the knowledge database as turning points in the live expert conversation to prompt the exchange of information between the expert and the user, to use the exchanged information to identify appropriate edges at each node and to extend the expert conversation across the identified appropriate edges through the plurality of nodes.

2. The method of claim 1, wherein each node in each dialogue comprises questions to be presented to the user, a data entry point or combinations thereof.

3. The method of claim 1, the expert conversation comprises a plurality of concurrent active threads, each active thread comprising a unique sequence of nodes and edges traversed by the user in the expert conversation starting from one of a plurality of pre-defined start nodes.

4. The method of claim 3, further comprising inactivating any active thread that traverses a node in the identified dialogue previously traversed by another active thread.

5. The method of claim 1, wherein:
   the step of constructing the knowledge database further comprises using a plurality of authors to collaboratively author the plurality of dialogues; and
   the method further comprises restricting permission to modify specific node groups to predetermined authors based on the given subject associated with each node group.

6. The method of claim 1, wherein the step of constructing the knowledge database further comprises using a web-based dialogue authoring tool running on a computing system to provide for author access to the dialogues in the knowledge database, the web-based dialogue authoring tool in communication with the knowledge database and at least one web browser.

7. The method of claim 1, wherein at least one node in each dialogue comprises two or more associated edges extending from that node to two or more additional nodes.

8. The method of claim 1, wherein the nodes comprise multiple choice nodes, each multiple choice node comprising a single question with a plurality of answers, each answer associated with a given destination node linked to that multiple choice node by one of the plurality of edges.

9. The method of claim 1, wherein the nodes comprise text classifier nodes, each text classifier node comprising a text entry field and a trained text classifier to classify text entered by the user into one of a plurality of pre-defined classes where each class has an associated destination node linked to that text classifier node by one of the plurality of edges.

10. The method of claim 1, wherein the nodes comprise text search nodes, each teach search node comprising a single question and a plurality of text alternatives that are displayed in response to entered text, each text alternative matching at least a portion of the entered text.

11. The method of claim 1, wherein the nodes comprise decision nodes, each decision node comprising logic to determine a destination node linked to that decision node by one of the plurality of edges based on at least one of data and answers entered by the user at nodes other than that decision node.

12. The method of claim 1, further comprising using a graphical user interface to display to the user a current active state of the expert conversation and a full sequence of all questions, answers and data submissions that yielded the current active step.

13. The method of claim 12, further comprising:
   using the graphical user interface to change one or more previously inputted answers and data submissions; and
   modifying the current active state and the full sequence of all questions answers and data submission in response to the change in the previously inputted answers and data submissions.

14. The method of claim 1, further comprising logging a history of all expert conversations in the knowledge database.

15. The method of claim 1, wherein the expert conversation comprises an interrogative dialogue between the expert and the user.

16. A non-transitory computer-readable storage medium containing a computer-readable code that when read by a computer causes the computer to perform a method for conducting an expert conversation, the method comprising:
   constructing a knowledge database comprising a dialogue repository comprising a plurality of dialogues, each dialogue representing a framework for creating at least one expert conversation and comprising a plurality of nodes and a plurality of edges extending between pairs of nodes, by identifying a subject for each node and associating an identifying text string with each node, the identifying text string comprising the identified subject for each node;
   grouping the nodes by common subject; into a plurality of node groups, each node group associated with a given subject;
   identifying containment hierarchies among the subjects, each containment hierarchy comprising a subset relationship between a given pair of subjects;
   organizing the node groups in the knowledge database in accordance with the containment hierarchies; and
   using the dialogue repository in combination with a runtime dialogue system in communication with the knowledge database and executing on a computing system that is in communication with an expert and a user to use the knowledge database to conduct a live expert conversation between the expert and the user using the plurality of nodes in the knowledge database as turning points in the live expert conversation to prompt the exchange information between the expert and the user, to use the exchanged information to identify appropriate edges at each node and to extend the expert conversation across the identified appropriate edges through the plurality of nodes.

17. The non-transitory computer-readable storage medium of claim 16, wherein:
the step of constructing the knowledge database further comprises using a plurality of authors to collaboratively author the plurality of dialogues; and
the method further comprises restricting permission to modify specific node groups to predetermined authors based on the given subject associated with each node group.

* * * * *